US010171695B1

(12) United States Patent
Yellapragada et al.

(10) Patent No.: US 10,171,695 B1
(45) Date of Patent: Jan. 1, 2019

(54) OUT-OF BOUNDS DETECTION OF A DOCUMENT IN A LIVE CAMERA FEED (71) Applicant: INTUIT INC., Mountain View, CA (US)

(72) Inventors: Vijay Yellapragada, Mountain View, CA (US); Peijun Chiang, Mountain View, CA (US); Daniel Lee, Mountain View, CA (US); Jason Hall, Mountain View, CA (US); Shailesh Soliwal, Redwood City, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 15/623,113

(22) Filed: Jun. 14, 2017

(51) Int. Cl.
*H04N 1/00* (2006.01)
*H04N 1/195* (2006.01)
(Continued)

(52) U.S. Cl.
CPC ..... *H04N 1/00713* (2013.01); *H04N 1/00737* (2013.01); *H04N 1/00748* (2013.01); *H04N 1/00771* (2013.01); *H04N 1/19594* (2013.01); *G06K 9/3275* (2013.01); *G06K 9/344* (2013.01); *H04N 1/00702* (2013.01); *H04N 1/00708* (2013.01); *H04N 1/00718* (2013.01); *H04N 1/00721* (2013.01); *H04N 1/00726* (2013.01); *H04N 1/387* (2013.01); *H04N 1/3873* (2013.01);
(Continued)

(58) Field of Classification Search
CPC combination set(s) only.
See application file for complete search history.

(56) References Cited

U.S. PATENT DOCUMENTS 8,379,914 B2 * 2/2013 Nepomniachtchi .. G06Q 20/042
235/379
8,620,058 B2 * 12/2013 Nepomniachtchi ...... G06K 9/36
382/137
(Continued)

FOREIGN PATENT DOCUMENTS

WO 2015073920 A1 5/2015
WO 2017008031 A1 1/2017
WO 2017042708 A1 3/2017

OTHER PUBLICATIONS

Arbelaez et al., Contour Detection and Hierarchical Image Segmentation, IEEE Transactions on Pattern Analysis and Machine Intelligence, vol. 33, No. 5, May 2011.*
(Continued)

*Primary Examiner* — Barbara D Reinier
(74) *Attorney, Agent, or Firm* — Patterson & Sheridan LLP (57) ABSTRACT

Aspects of the present disclosure provide methods and apparatuses for processing a digital image of a document, for example, to determine whether the document is a long document. An exemplary method generally includes obtaining a plurality of digital images of the document, segmenting at least a first digital image of the plurality of images into pixels associated with a foreground of the first digital image and pixels associated with a background of the first digital image, detecting a plurality of contours in the segmented first digital image, deciding, for each detected contour of the plurality of contours, whether that contour is an open contour or a closed contour, and determining that one or more sides of the document is out-of-bounds based, at least in part, on the decisions.

20 Claims, 8 Drawing Sheets (51) Int. Cl.
*H04N 101/00* (2006.01)
*H04N 1/387* (2006.01)
*G06K 9/32* (2006.01)
*G06K 9/34* (2006.01)

(52) U.S. Cl.
CPC . *H04N 2101/00* (2013.01); *H04N 2201/0081* (2013.01)

(56) References Cited

U.S. PATENT DOCUMENTS

| | | | | |
|---|---|---|---|---|
| 8,717,412 | B2* | 5/2014 | Linder | G03B 37/00 |
| | | | | 348/222.1 |
| 8,885,229 | B1* | 11/2014 | Amtrup | H04N 1/00251 |
| | | | | 358/1.15 |
| 9,117,118 | B1 | 8/2015 | Lewis et al. | |
| 9,253,349 | B2 | 2/2016 | Amtrup et al. | |
| 9,514,357 | B2* | 12/2016 | Macciola | H04N 1/387 |
| 9,544,457 | B2* | 1/2017 | Wada | H04N 1/00005 |
| 9,729,755 | B2* | 8/2017 | Stuart | H04N 1/00005 |
| 2001/0021270 | A1 | 9/2001 | Kobara et al. | |
| 2003/0086615 | A1* | 5/2003 | Dance | G06K 9/00456 |
| | | | | 382/200 |
| 2009/0103811 | A1* | 4/2009 | Chen | H04N 1/3875 |
| | | | | 382/190 |
| 2010/0060910 | A1* | 3/2010 | Fechter | G06K 9/00449 |
| | | | | 358/1.9 |
| 2014/0032406 | A1 | 1/2014 | Roach et al. | |
| 2014/0368891 | A1 | 12/2014 | Beato et al. | |
| 2015/0138399 | A1 | 5/2015 | Ma et al. | |
| 2016/0088178 | A1* | 3/2016 | Hansen | H04N 1/028 |
| | | | | 358/479 |
| 2017/0134611 | A1 | 5/2017 | Thomas et al. | |
| 2017/0270508 | A1* | 9/2017 | Roach | G06Q 20/042 |
| 2017/0280011 | A1* | 9/2017 | Pashintsev | H04N 1/3876 |

OTHER PUBLICATIONS

Bidyut Chaudhuri: "Digital Document Processing" In: "Digital Document Processsing", Jan. 1, 2007, Springer, XP055454189, p. 307, 325.

M. Mirmehdi et al.: "A non-contact method of capturing low-resolution text for OCR", Pattern Analysis and Applications, vol. 6, No. 1, Apr. 22, 2003, pp. 12-21, XP055322891.

Paul Clark et al: "Recognising text in real scenes", International Journal on Document Analysis and Recognition, Springer, Heidelbert, DE, vol. 4, No. 4, Jul. 1, 2002, pp. 243-257.

International Searth Report / Written Opinion issued to PCT/US2017/037763, dated Mar. 7, 2018.

International Search Report/Written Opinion issued in PCT/US2017/037835 dated Feb. 15, 2018.

\* cited by examiner

FIG. 9

OUT-OF BOUNDS DETECTION OF A DOCUMENT IN A LIVE CAMERA FEED

BACKGROUND

Field

The present disclosure generally relates to processing digital images of documents or forms. More specifically, the present disclosure provides techniques for detecting whether one or more sides of a document is out of bounds in a live camera feed.

Related Art

In the course of using a mobile application, it is sometimes useful to capture an image of a document. For example, a user of a financial management application may capture an image of a receipt related to a financial transaction for use within the application. In some cases, however, due to the limitations of cameras, such as restricted fields of view, a document may be too long to capture in a single image of sufficient quality to identify the document's textual content.

SUMMARY

Aspects of the present disclosure provide a computer-implemented method for processing a digital image of a document. The computer-implemented method generally includes obtaining a plurality of digital images of the document, determining a type of the document, loading one or more pre-defined metrics associated with the document based on the determined type of the document, determining one or more characteristics of the document based on one or more analyses performed on the plurality of digital images of the document, comparing the one or more characteristics of the document with the one or more pre-defined metrics, and determining the document to be a long document based, at least in part, on the comparison.

Another embodiment provides a non-transitory computer-readable storage medium having instructions, which, when executed on a processor, performs an operation for processing a digital image of a document. The operation generally includes obtaining a plurality of digital images of the document, determining a type of the document, loading one or more pre-defined metrics associated with the document based on the determined type of the document, determining one or more characteristics of the document based on one or more analyses performed on the plurality of digital images of the document, comparing the one or more characteristics of the document with the one or more pre-defined metrics, and determining the document to be a long document based, at least in part, on the comparison.

Still another embodiment of the present invention includes a processor and a memory storing instructions that, when executed on the processor, performs an operation for processing a digital image. The operation generally includes obtaining a plurality of digital images of the document, determining a type of the document, loading one or more pre-defined metrics associated with the document based on the determined type of the document, determining one or more characteristics of the document based on one or more analyses performed on the plurality of digital images of the document, and comparing the one or more characteristics of the document with the one or more pre-defined metrics, and determining the document to be a long document based, at least in part, on the comparison.

Aspects of the present disclosure provide a computer-implemented method for processing a digital image of a document. The computer-implemented method generally includes obtaining a plurality of digital images of the document, segmenting at least a first digital image of the plurality of images into pixels associated with a foreground of the first digital image and pixels associated with a background of the first digital image, detecting a plurality of contours in the segmented first digital image, deciding, for each detected contour of the plurality of contours, whether that contour is an open contour or a closed contour, and determining that one or more sides of the document is out-of-bounds based, at least in part, on the decisions.

Another embodiment provides a non-transitory computer-readable storage medium having instructions, which, when executed on a processor, performs an operation for processing a digital image of a document. The operation generally includes obtaining a plurality of digital images of the document, segmenting at least a first digital image of the plurality of images into pixels associated with a foreground of the first digital image and pixels associated with a background of the first digital image, detecting a plurality of contours in the segmented first digital image, deciding, for each detected contour of the plurality of contours, whether that contour is an open contour or a closed contour, and determining that one or more sides of the document is out-of-bounds based, at least in part, on the decisions.

Still another embodiment of the present invention includes a processor and a memory storing instructions that, when executed on the processor, performs an operation for processing a digital image. The operation generally includes obtaining a plurality of digital images of the document, segmenting at least a first digital image of the plurality of images into pixels associated with a foreground of the first digital image and pixels associated with a background of the first digital image, detecting a plurality of contours in the segmented first digital image, deciding, for each detected contour of the plurality of contours, whether that contour is an open contour or a closed contour, and determining that one or more sides of the document is out-of-bounds based, at least in part, on the decisions.

DETAILED DESCRIPTION

Optical character recognition (OCR) techniques are generally used to convert images of text into computer-encoded text. OCR results tend to be more accurate when used to evaluate high-resolution, low-noise images of typed, black text against a white background. However, in practice, text in digital images is often noisy, obscured, or otherwise less than ideal. In some cases, for example, a physical document may be relatively obscured or deteriorated as a result of decomposition, excessive use, folding, fingerprints, water damage, or mildew at the time an image of the document is captured. Of course, an image of a document may be of poor-quality for a variety of other reasons (e.g., if the document is no longer extant and better images therefore cannot be obtained). Poor image quality tends to increase OCR processing time and decrease final accuracy. Thus, OCR techniques often fail to produce satisfactory results on poor-quality images.

In order to make information more readily accessible and searchable, individuals, businesses, and governmental agencies often digitize paper forms. For example, the Internal Revenue Service (IRS) may wish to digitize tax forms (e.g., 1040, W2, 1098-T, or 1099-MISC) submitted on paper so that information from the tax forms can be inspected for errors by an automated process. In another example, a law firm may digitize a large number of paper forms received in response to a discovery request so that the documents can be electronically searched for certain keywords. In another example, a web-based genealogical research company may wish to digitize a large number of death certificates in order to make information from the death certificates electronically searchable for customers. In yet another example, a consumer may wish to digitize a large number of receipts to keep track of how much that consumer is spending.

In some cases, individuals may wish to use commercially available software, capable of performing OCR on images of digitized documents (e.g., receipts, pay stubs, etc.), to keep track of their financials. For example, in some cases, a user of the software may capture an image of a receipt related to a financial transaction for use within the software. However, in some cases, due to the limitations of cameras, such as restricted fields of view, a document may be too long to capture in a single image of sufficient quality to identify the document's textual content. Further, without a reference point, it may be difficult for a computer executing the software to determine whether an object, such as a document, is long/tall in an image. For example, it is possible to capture the world's largest building in a single image, and it is also possible to capture a single image of a toy house. However, the computer may not readily be able to determine which of the world's largest building or the toy house is actually taller in real life.

Accordingly, aspects of the present disclosure generally propose techniques for solving the above-identified problem related to not knowing a height difference between two objects without a reference point, and specifically for detecting whether a document captured in an image is a long document. Doing so may improve OCR performance, reduce processing time, and prevent certain errors that occur when an individual is trying to digitize a long document. For example, techniques presented herein may improve the functioning of a computer by reducing power consumption and processing resources (e.g., time using a processor) waste at the computer by allowing the computer to stop processing the image of the document when it is determined that the document is a long document or when the document is determined to be out of bounds of the image. In other words, the computer does not have to waste power and processing resources on processing an image of a document that is of poor quality (e.g., the document is out of bounds of the image) or an image of a document that is incomplete.

As discussed below, identifying whether a document in an image is a long document may be based on various factors. For example, identifying whether a document is a long document may be based on factors such as the size of font detected on the document, bounding information associated with edges of the document, and/or dimensions/aspect ratio of the document appearing in the image, as described in greater detail below.

In some cases, when the detects a long document in a user-captured image, the software may stop processing the user-captured image and alert the user that the document is too long to be captured in a single image. The software may then direct the user to capture multiple images of the document that cover different portions of the document. The software may then process the multiple images (e.g., by stitching the multiple images together) and perform OCR on the document.

Figure 1:
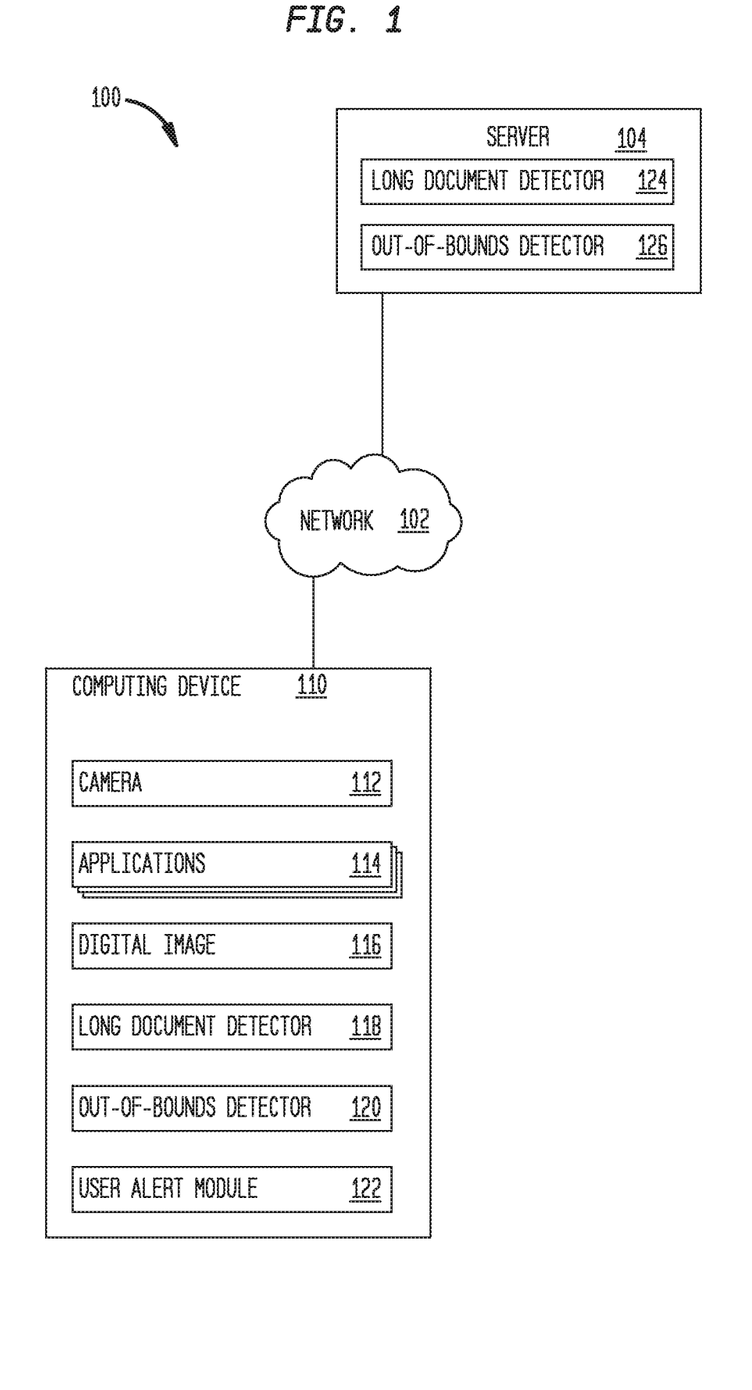
FIG. 1 illustrates an example computing environment that may be used to practice techniques presented herein.
Figure 4:
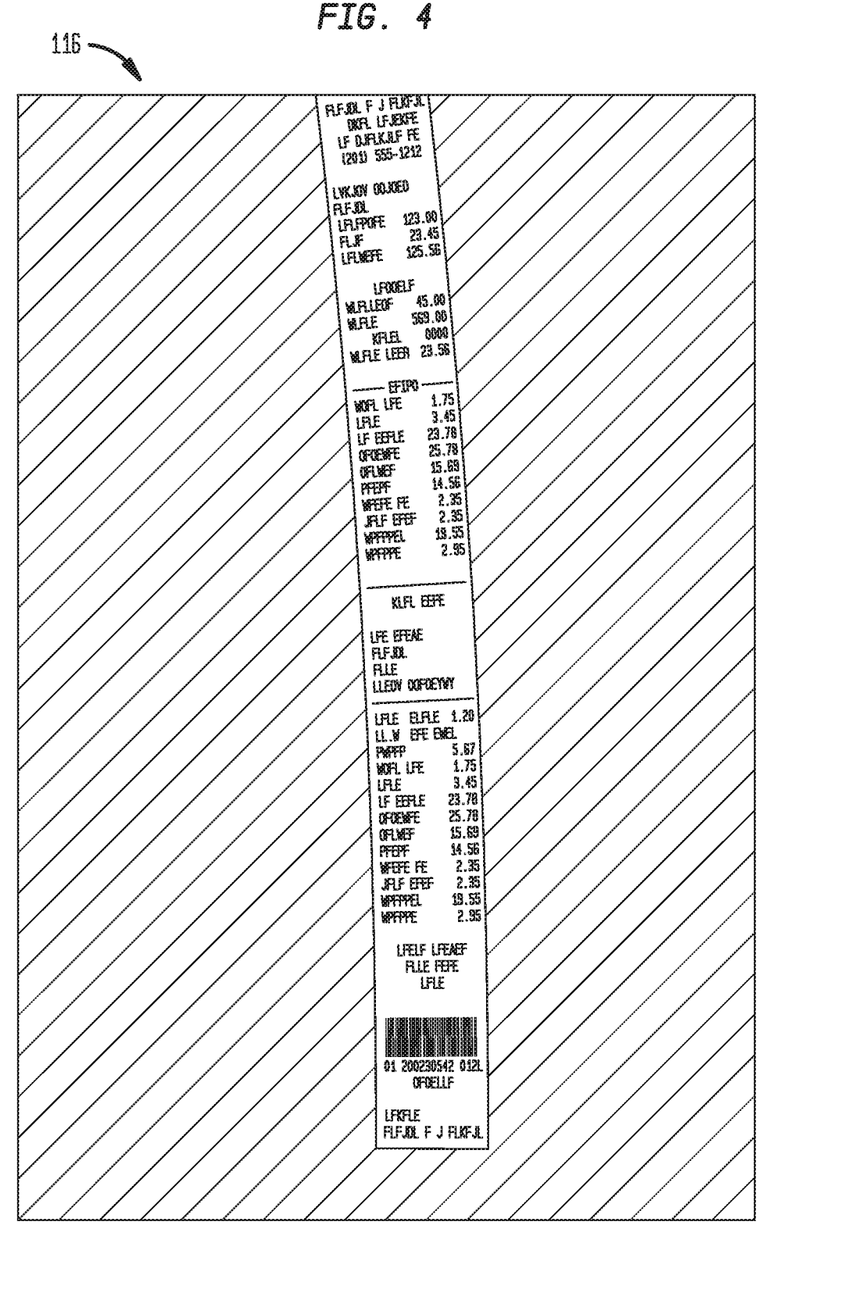
FIG. 4 illustrates an example digital image of a document, according to certain aspects of the present disclosure.

FIG. 1 illustrates a computing environment 100 that may be used to perform techniques described in the present disclosure. A computing device 110 and a server 104 communicate via a network 102. As shown, the computing device 110 includes a camera 112 used to capture images of documents. In addition, the computing device 110 may be used to execute applications 114 (e.g., financial management software). In some cases, a user of the computing device 110 captures a digital image 116 (e.g., as illustrated in FIG. 4) of a document using the camera 112. One of the applications 114 may send the digital image 116 of the document to the server 104. In an alternative embodiment, a scanner may be used in place of the camera 112.

As noted above, in some cases, the document captured in the digital image 116 may be too long to capture in a single image of sufficient quality to identify the document's textual content. According to certain aspects, in such a case, a long document detector 118 in the computing device 110 may determine that the document in the digital image 116 is a long document. The long document detector 118 may make this determination based on various factors such as the size of font detected on the document, bounding information associated with edges of the document, and/or dimensions/ aspect ratio of the document appearing in the image, as described in greater detail below. Further, while only a single digital image 116 is illustrated in FIG. 1, it should be understood that the long document detector 118 may make the determination of whether a document is a long document over a plurality of digital images (e.g., a live video stream).

According to aspects, the computing device 110 may also include an out-of-bounds detector 120 that is configured to determine bounding information associated with the document in the digital image 116. For example, the out-of-bounds detector 120 may be configured to determine whether one or more portions (e.g., edges) of the document in the digital image 116 are out of bounds of the digital image 116 (e.g., the one or more portions of the document are not contained within the digital image 116). As noted, this bounding information may be used by the long document detector 118 in determining whether the document in the digital image 116 is a long document. According to certain aspects, while the out-of-bounds detector 120 is illustrated as a separate component from the long document detector 118, it should be understood that the out-of-bounds detector 120 and the long document detector 118 may comprise a single component.

The computing device 110 also includes a user alert module 122 that may direct a user to capture multiple digital images of the document, focused on different portions of the document, for example, if it is determined that the document in the digital image 116 is a long document. In some cases, if the document is determined to be a long document, the user alert module 122 may direct the user of the computing device 110 to scan the document at close range using the camera 112 in a video capture mode. Accordingly, once the user of the computing device 110 has captured images of the long document with sufficient quality (e.g., textual content on the document is discernable), the computing device may perform optical character recognition (OCR) on the document to determine the documents textual content and store a digitalized version of the document in a searchable database.

Additionally, in some cases, the server 104 may include a long document detector 124 and an out-of-bounds detector 126 that can perform the same functions as the long document detector 118 and out-of-bounds detector 120. For example, instead of the long document detector 118 determining whether a document in the digital image 116 is a long document, one or more applications 114 in the computing device 110 may transmit the digital image 116 to the server 104 (e.g., via the Network 102) and the long document detector 124 may determine that the document in the digital image 116 is a long document. According to aspects of the present disclosure, if the long document detector 124 determines the document to be a long document, the server 104 may direct the user alert module 122 in the computing device 110 to alert the user to capture multiple, focused images of the document, as described above.

While the server 104 is depicted as a single server, it should be understood that techniques of the present disclosure can be applied in a cloud-based scheme using multiple physical or virtual computing resources. The long document detector 124 and the out-of-bounds detector 126 may be distributed across different computing resources as part of a cloud-based computing system. Further, the computing device 110 may be considered to be representative of a variety of devices, such as a mobile device, a cellular phone, a smart phone, a tablet, a laptop computer, a desktop computer, a personal digital assistant (PDA), or any computing system that may execute software applications.

Figure 2:
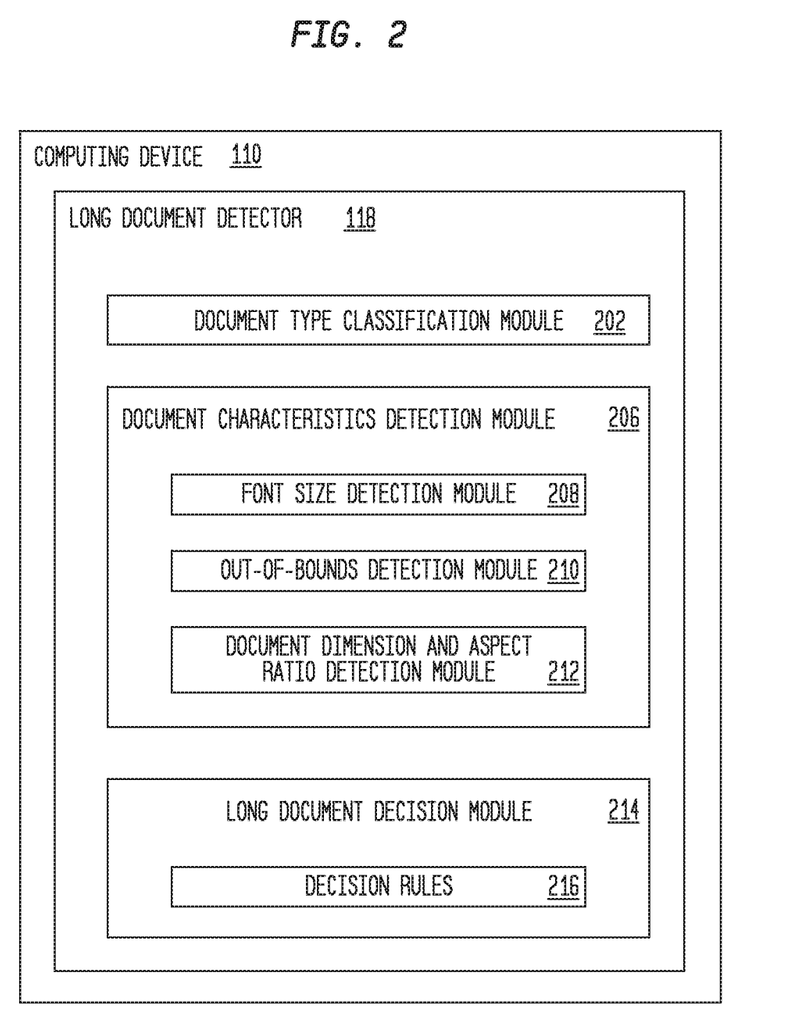
FIG. 2 illustrates various components of a long document detector configured to whether a document in a digital image is a long document, according to certain aspects of the present disclosure.

FIG. 2 illustrates a more detailed view of various components that make up the long document detector 118. As illustrated, the long document detector 118 may comprise a document type classification module 202 which determines the type of a document (e.g., a grocery receipt, a tax form, a pay stub, and invoice, etc.) in a user-captured digital image (e.g., digital image 116). For example, a user of the computing device 110 may capture a digital image 116 (or multiple images, e.g., a video stream) of the form. An example digital image 116 is illustrated in FIG. 4. The digital image 116 may then be sent to and received at the document type classification module 202, which may process the digital image 116 to determine the type of document contained within the digital image 116. For example, the document type classification module 202 may perform optical character recognition (OCR) on the digital image 116 to determine the textual content of the document.

The document type classification module 202 may then compare the textual content of the document with a pre-defined dictionary of words. According to aspects, the pre-defined dictionary comprises a list of words that are indicative of certain types of documents. For example, in some cases, the pre-defined dictionary may comprise a list of words associated with receipts, such as store names (e.g., Target®, Best Buy®, Costco®, etc.) or names of items typically sold at these stores. The pre-defined dictionary may also comprise words associated with tax forms, such as "W2", "1099", "Tax return", "IRS", etc. Thus, for example, the document type classification module 202 may recognize that the document in the digital image 116 comprises the word "Costco" and determines that the type of the document in the digital image 116 is a receipt, for example, as illustrated in FIG. 4.

The document type classification module 202 may then load pre-defined metrics (e.g., from memory in the computing device 110, not shown) associated with the detected type of document. For example, assuming that the type of document is a receipt, the associated metrics may include a font size range (e.g., between 24 and 36 pixels), an aspect ratio threshold (e.g., 3-to-1), and a minimum height percentage of the document as compared to the whole digital image 116 (e.g., 80%). According to aspects, these pre-defined metrics may be used to determine whether or not the document in the digital image 116 is a long document, for example, as described in greater detail below.

In some cases, if the document type classification module 202 is unable to determine the type of the document in the digital image 116, the document type classification module 202 may load default pre-defined metrics or may provide an indication to the user of the computing device 110 (e.g., via the user alert module 122) to take a more close-up picture of the document (e.g., if the document type classification module 202 is unable to recognize the textual content on the document, for example, due to the text size being recognized as too small).

According to aspects, once the type of the document in the digital image 116 is determined and the pre-defined metrics are loaded, the digital image 116 may be sent to and received at a document characteristics detection module 206. According to aspects, the document characteristics detection module 206 analyzes the digital image 116 and determines additional characteristics associated with the document in the digital image 116, for example, based on the analysis. For example, as illustrated, the document characteristics detection module 206 may analyze the digital image 116 with a font size detection module 208 to determine a text size of text appearing on the document. The document characteristics detection module 206 may also analyze the digital image 116 to determine bounding information associated with edges of the document in the digital image 116 using an out-of-bounds detection module 210. Further, the document characteristics detection module 206 may also analyze the digital image 116 to determine the dimensions and aspect ratio of the document in the digital image 116, for example, using a document dimension and aspect ratio detection module 212. According to aspects, these analyses may then be used to determine whether the document in the digital image 116 is a long document, as described in greater detail below.

As noted, the document characteristics detection module 206 includes a font size detection module 208 for determining the font size of the text on the document in the digital image 116. According to aspects, the font size detection module 208 may determine the font size of the text based, for example, on an analysis of text blocks. For example, the font size detection module 208 may determine a number of text blocks on the document in the digital image 116 by drawing bounding rectangles around lines of text on the document. For example, given a document with three lines of text, the font size detection module 208 determines that there are three text blocks by drawing bounding rectangles around each line of text. The font size detection module 208 may then determine the average height of the text blocks. According to aspects, based on the average height of the text blocks, the font size detection module 208 may approximate the size of the text on the document in the digital image 116. That is, the average height of the text blocks may be an estimator of text size.

Additionally, as noted above, the document characteristics detection module 206 includes an out-of-bounds detection module 210 for determining bounding information associated with edges of the document in the digital image 116. For example, the out-of-bounds detection module 210 may be used for determining whether any part of the document in the digital image 116 is out of bounds of the digital image 116. Further, as will be described in greater detail below, the bounding information may be used when determining whether the document in the digital image 116 is a long document.

Figure 3:
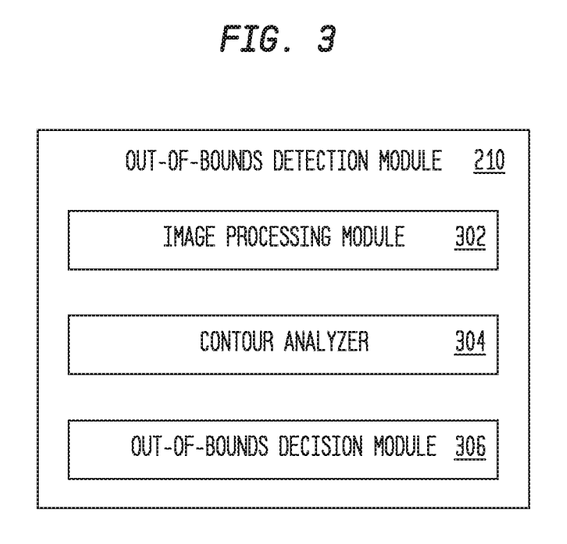
FIG. 3 illustrates various components of an out-of-bound detection module configured to detect whether one or more sides of a document in a digital image is out of bounds of the digital image, according to certain aspects of the present disclosure

FIG. 3 illustrates a more detailed view of the out-of-bounds detection module 210. As illustrated, the out-of-bounds detection module 210 comprises an image processing module 302 that prepares the digital image 116 for contour analysis by the contour analyzer 304. Based on the contour analysis, described in greater detail below, an out-of-bounds decision module 306 may determine that one or more edges of the document in the digital image 116 are out of bounds of the digital image 116.

As noted, the image processing module 302 processes the digital image 116 to prepare the digital image 116 for contour analysis. For example, the image processing module 302 may receive the digital image 116. The image processing module 302 may then scale the digital image 116 down (e.g., reduce the size of the digital image 116). The scaled-down digital image 116 may then be processed by a clustering algorithm (e.g., OpenCV kmeans method) to separate the pixels in the scaled-down digital image 116 into two clusters: one cluster representing the foreground (e.g., the document in the digital image 116), and another cluster representing the background. According to aspects, the image processing module 302 may then create a segmented image such that pixels belonging to the foreground cluster of the scaled-down digital image 116 are black and pixels belonging to the background cluster of the scaled-down digital image 116 are white. According to aspects, creating this segmented image allows the contour analyzer 304 to more-easily determine/find the contours in the segmented image (i.e., corresponding to the digital image 116).

Accordingly, once the image processing module 302 has created the segmented image, the contour analyzer 304 may process the segmented image to determine contours in the segmented image. The contour analyzer 304 may then analyze a hierarchy of the contours (e.g., the nesting of contours) found in the segmented image and determine which contours are open or closed. A simple example of a closed contour is a rectangle whose four sides are all contained within the segmented image, whereas an open contour is, for example, a rectangle with one or more sides of the rectangle outside of the segmented image. More specifically, an open contour is one that does not have any child contour in the hierarchy (e.g., the contour does not bound another contour). According to aspects, for each continuous contour (e.g., whether open or closed) found in the segmented image, the contour analyzer 304 is configured to create a bounding rectangle that encompasses that contour. The contour analyzer 304 may then compute the area (e.g., pixels squared) of each bounding rectangle and determine the bounding rectangle with the largest area.

According to aspects, if the bounding rectangle with the largest area bounds an open contour and if one or more sides of this bounding rectangle touches one or more of the edges of the segmented image, the out-of-bounds decision module 306 may conclude that part of the document in the digital image 116 is out of bounds. Otherwise, if the bounding rectangle with the largest area bounds an open contour and if none of the sides of this bounding rectangle touches the edges of the segmented image, the out-of-bounds decision module 306 may conclude that the document in the digital image 116 is not out of bounds of the digital image 116. Likewise, if the bounding rectangle with the largest area bounds a closed contour, the out-of-bounds decision module 306 may conclude that the document in the digital image 116 is not out of bounds of the digital image 116.

According to aspects, if the out-of-bounds decision module 306 determines that part of the document is out of bounds of the digital image 116, out-of-bounds decision module 306 may direct the user alert module 122 to inform the user of the computing device 110 that the document in the digital image 116 is out of bounds and direct the user to capture an additional digital image fully encompassing the document.

Additionally, in some cases, if the out-of-bounds decision module 306 determines that part of the document is out of bounds of the digital image 116 (e.g., the bounding rectangle with the largest area bounds an open contour and one or more sides of this bounding rectangle touches one or more edges of the digital image 116), the contour analyzer 304 may determine the sides of the document that are out of bounds of the digital image 116. According to aspects, the contour analyzer 304 may determine which sides of the document are out of bounds of the digital image 116 based on an analysis of the open contour that is bounded by the bounding rectangle with the largest area. For example, the contour analyzer 304 may determine which side of the bounding rectangle with the largest area touches an edge of the digital image 116, and may deduce which corners of this bounding rectangle are out of bounds. For example, if the top side of this bounding rectangle touches an edge of the digital image 116, the contour analyzer 304 may determine that the top left and top right corners are missing. According to aspects, based on the missing corners, the contour analyzer 304 may deduce which sides of the document are out of bounds of the digital image 116.

Further, once the contour analyzer 304 determines the sides of the document that are out of bounds of the digital image 116, the contour analyzer 304 may supply the user alert module 122 with this information, which may, in turn, inform the user of the computing device 110 of the sides of the document that are out of bounds. This information may be used by the user of the computing device to capture an additional image of the document, for example, as described above. According to aspects, this process of determining the bounding information of the document in the digital image 116 will be described in greater detail below, with reference to FIGS. 6-8.

Returning to FIG. 2, as noted above, the document characteristics detection module 206 includes a document dimension and aspect ratio detection module 212 for determining the dimensions and aspect ratio of the document in the digital image 116. According to aspects, the document dimension and aspect ratio detection module 212 may be configured to determine the dimensions and aspect ratio of the document in the digital image 116 by again analyzing the bounding rectangle with the largest area (e.g., as described above in relation to the out-of-bounds detection module 210). In some cases, the document dimension and aspect ratio detection module 212 may independently determine the contours in the digital image 116 (e.g., using the same or similar techniques described above) or may re-use contour information determined by the contour analyzer 304. According to aspects, the document dimension and aspect ratio detection module 212 may determine the height and width of the bounding rectangle with the largest area (e.g., the rectangle that bounds the document in the digital image 116) and, using the determined height and width, determine the aspect ratio (e.g., width divided by height).

According to aspects, the long document detector 118 may determine the characteristics of the document described above (e.g., font size, bounding information, and dimensions/aspect ratio) over multiple consecutive digital images and may keep track of the results. These results (i.e., the document characteristics), in addition to the pre-defined metrics corresponding to the determined document type described above and one or more conditions (e.g., decision rules), may then be used by the long document decision module 214 to determine whether the document in the digital image 116 is a long document or not, as described below.

For example, in some cases, the long document decision module 214 may determine the document in the digital image 116 to be a long document if the font size of the text on the document (e.g., as determined by the font size detection module 208) is less than a lower bound of the loaded pre-defined font size range over the multiple consecutive images and if the bounding information of the document in the multiple consecutive images indicates that one or more sides of the document are out-of-bounds. In such case, it may be assumed that the camera 112 is being held far away from the document such that the text on the document is small and also that the user of the computing device 110 has difficulty fitting the document within a single camera frame.

In other cases, the long document decision module 214 may determine the document in the digital image 116 to be a long document if, over the multiple consecutive digital images, a height dimension of the document (e.g., as determined by the document dimension and aspect ratio detection module 212) is greater than the pre-defined minimum height percentage threshold of each of the multiple consecutive digital images (e.g., the document's height is greater than 'X' percent of the digital image 116), and if the aspect ratio of the document (e.g., as determined by the document dimension and aspect ratio detection module 212) is greater than the pre-defined aspect ratio threshold for the multiple consecutive images. In such a case, it may be assumed that the user of the computing device 110 held the camera 112 high enough so that the whole document would fit inside one camera frame, and since the camera was held high, the text on the document is small. Additionally, by checking whether the document height is greater than the defined minimum height percentage threshold of a digital image, this reduces the possibility of a misdetermination where the document is actually a short document but the user just happened to hold the camera at a height such that the text size appears small.

In yet other cases, the long document decision module 214 may determine the document in the digital image 116 to be a long document if the font size of the text on the document in the digital image 116 is within the pre-defined font size range and if the bounding information indicates that one or more sides of the document is consistently out of bounds over the multiple consecutive images.

Otherwise, if the font size of the text on the document in the digital image 116 is at the top of the font size range or above and if the document is completely inside the first digital image 116 (e.g., the bounding information indicates that no sides of the document are out of bounds of the digital image 116), then the long document decision module 214 may conclude that the document in the digital image 116 is not a long document.

According to aspects, if the long document decision module 214 determines that the document in the digital image 116 is a long document (e.g., based on the techniques described above), the long document decision module 214 may direct the user alert module 122 to alert the user that the document is too long to be captured in a single image and direct the user to capture multiple digital images of the document, each digital image of the multiple digital images focusing on a different portion of the document such that a combination of each digital image of the multiple digital images of the document captures the entire document. For example, based on an identification that a first image of a document includes missing edges at the top and bottom of the document, computing device 110 can request that the user capture additional images representing a portion of the document above the portion captured in the first image and a portion of the document below the portion captured in the first image. The computing device 110 may then stitch together the multiple digital images to generate a single digital image of the document and may feed the single digital image of the document into an OCR module for text extraction and analysis.

Figure 5:
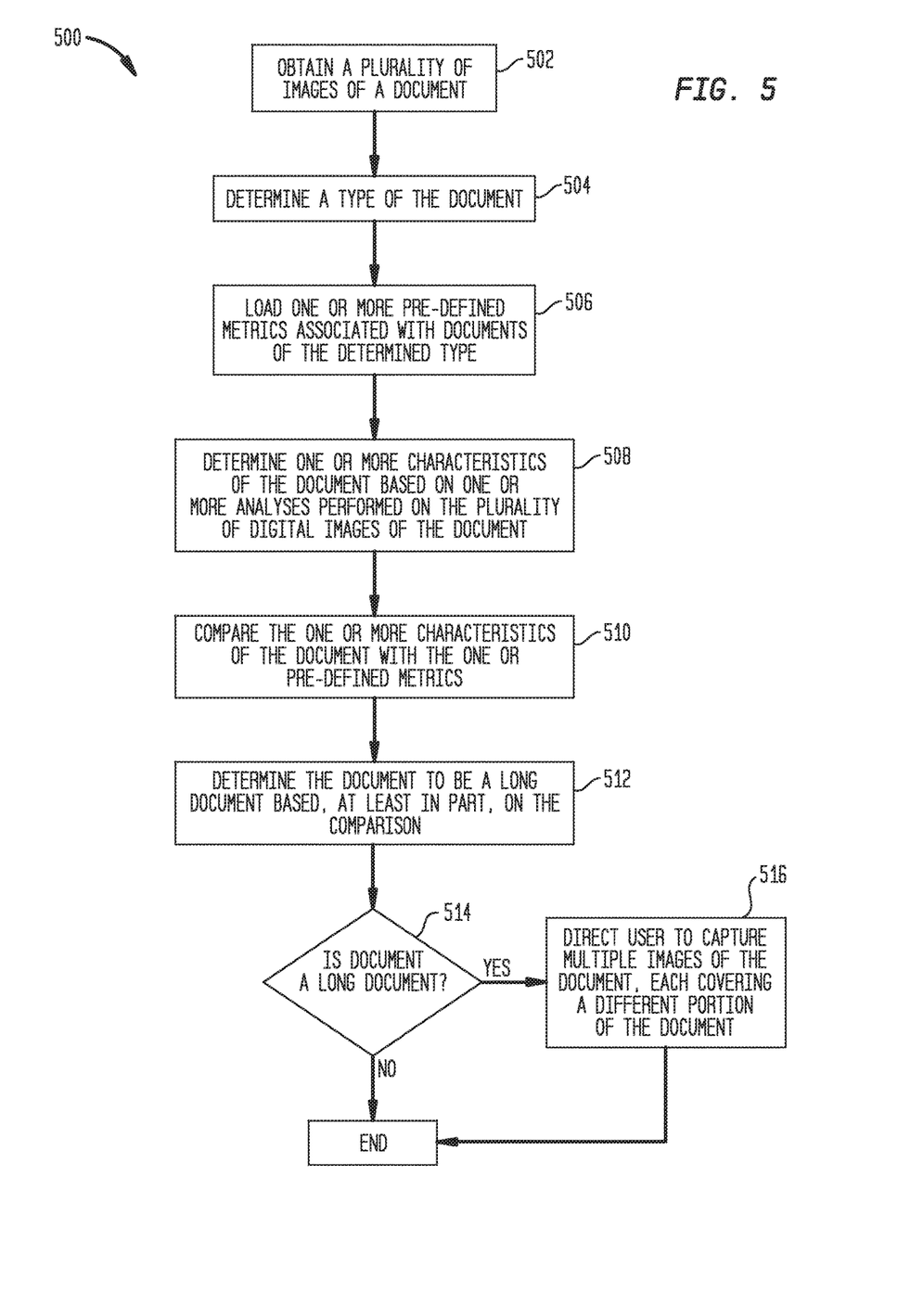
FIG. 5 illustrates a method for processing an image of a document, according to certain aspects of the present disclosure.

FIG. 5 is a flow diagram illustrating an exemplary method 500 for processing digital images of a document, for example, to determine if the document is a long document, according to certain aspects of the present disclosure. The method 500 may be performed, for example, by a computing device 110 and/or a server 104.

The method 500 begins at 502 by obtaining a plurality of digital images of the document. As noted above, this may involve a user capturing the plurality of images (e.g., digital image 116) of the document using a camera (e.g., camera 112). The plurality of digital images may then be forwarded to and obtained by, for example, a component configured to detect whether the document is a long document (e.g., long document detector 118). According to aspects, a long document may be a document that is too long to capture in a single image of sufficient quality to identify the document's textual content.

At 504, a type of the document in the plurality of images is determined. For example, the document type classification module 202 may receive the plurality of digital images of the document and perform optical character recognition (OCR) on the plurality of digital images to determine the textual content of the document. The document type classification module 202 may then compare the textual content of the document with a dictionary of words that are indicative of certain types of documents. For example, in some cases, the document may include a store name such as "Groceries-R-Us". The document type classification module 202 may search the dictionary of words for "Groceries-R-Us", and may determine that "Groceries-R-Us" is listed in the dictionary of words as being associated with the document type: receipts. Thus, the document type classification module may determine the type of the document in the plurality of documents to be a receipt.

At 506, the computing device 110 loads one or more pre-defined metrics associated with documents of the determined type. As noted above, pre-defined metrics may include a font size range for text appearing on documents of the determined type, an aspect ratio threshold, and/or a minimum height percentage of documents of the determined type as compared to a whole digital image of that type of document. For example, assuming that the document captured in the plurality of images is a receipt, the pre-defined metrics may include a font range between 24 and 36 pixels, an aspect ratio threshold of 3-to-1, and a minimum height percentage of the document as compared to the whole digital image 116 of 80%. According to aspects, these pre-defined metrics represent average values for these three categories of metrics based on typical, non-long receipts. That is, a typical, non-long receipt generally has a font size of 24 to 36 pixels, an aspect ratio of 3-to-1, and usually takes up 80% of the height of an image capturing this non-long receipt.

At 508, the computing device 110 determines one or more characteristics of the document in the plurality of digital images, based on one or more analyses performed on the plurality of digital images of the document.

For example, the computing device 110 may determine a font size of textual content on the document, bounding information associated with one or more sides of the document, dimensions of the document, and/or an aspect ratio of the document. As noted above, the computing device 110 may determine the font size of the textual content on the document based on an average text block size, for example, as described above.

Additionally, the computing device 110 may determine the bounding information by, for at least one image of the plurality of digital images, scaling down the plurality of images of the document, segmenting the scaled down image into groups of pixels corresponding to the foreground of the scaled down image (e.g., representing the document) and another group of pixels corresponding to the background of the image. The computing device may then find the contours in the segmented image and draw bounding rectangles around the found contours. According to aspects, the computing device 110 may then deduce that at least one side of the document is out of bounds of the segmented image if the rectangle with the largest area in the segmented image bounds an open contour and if one or more sides of this rectangle touch an edge of the segmented image. Additionally, the computing device may determine the dimensions and aspect ratio of the document by measuring the height and width of the rectangle with the largest area, as described above.

At 510, the computing device 110 compares the one or more characteristics of the document with the one or more pre-defined metrics. For example, the computing device 110 may compare the determined font size of the textual content on the document with the font size range. According to aspects, the computing device 110 may compare each of the determined characteristics of the document with their corresponding pre-defined metrics.

At 512, the computing device 110 determines the document to be a long document based, at least in part, on the comparison. For example, the computing device 110 may determine that the document in the plurality of images is a long document when the font size of the textual content on the document is less than a lower bound of the loaded pre-defined font size range over multiple consecutive images of the plurality of images (e.g., a configurable number of images) and when the bounding information of the document in the multiple consecutive images indicates that one or more sides of the document are out-of-bounds. Additionally, the computing device 110 may determine the document in the plurality of images to be a long document when, over the multiple consecutive digital images, a height dimension of the document is greater than the pre-defined minimum height percentage threshold of each of the multiple consecutive digital images and when the aspect ratio of the document is greater than the pre-defined aspect ratio threshold for the multiple consecutive images. Further, the computing device 110 may determine that the document in the plurality of images is a long document when the font size of the text on the document in the plurality of images is within the pre-defined font size range and when the bounding information indicates that one or more sides of the document is consistently out of bounds over the multiple consecutive images.

At 514, if the document in the plurality of documents is not a long document, the method 500 ends. In some cases, the computing device 110 may determine that the document in the plurality of images is not a long document if the font size of the text on the document in the digital image 116 is at or above the top of the font size range and if the document is completely inside the first digital image 116 (e.g., the bounding information indicates that no sides of the document are out of bounds of the digital image 116). In such a case, the user of the computing device 110 may be allowed to proceed and store a digital copy of the document.

If, however, at 514, the document in the plurality of documents is a long document, the method continues to 516 where the computing device 110 directs the user to capture multiple images of the document, each covering a different portion of the document. In some cases, the computing device 110 may direct the user to scan the document with the camera 112 (e.g., using a video capture mode). In response, the computing device may stitch together these images and store a digital copy of the document. In some cases, the computing device may perform OCR on the document and store textual content associated with the document in a searchable database.

Figure 6:
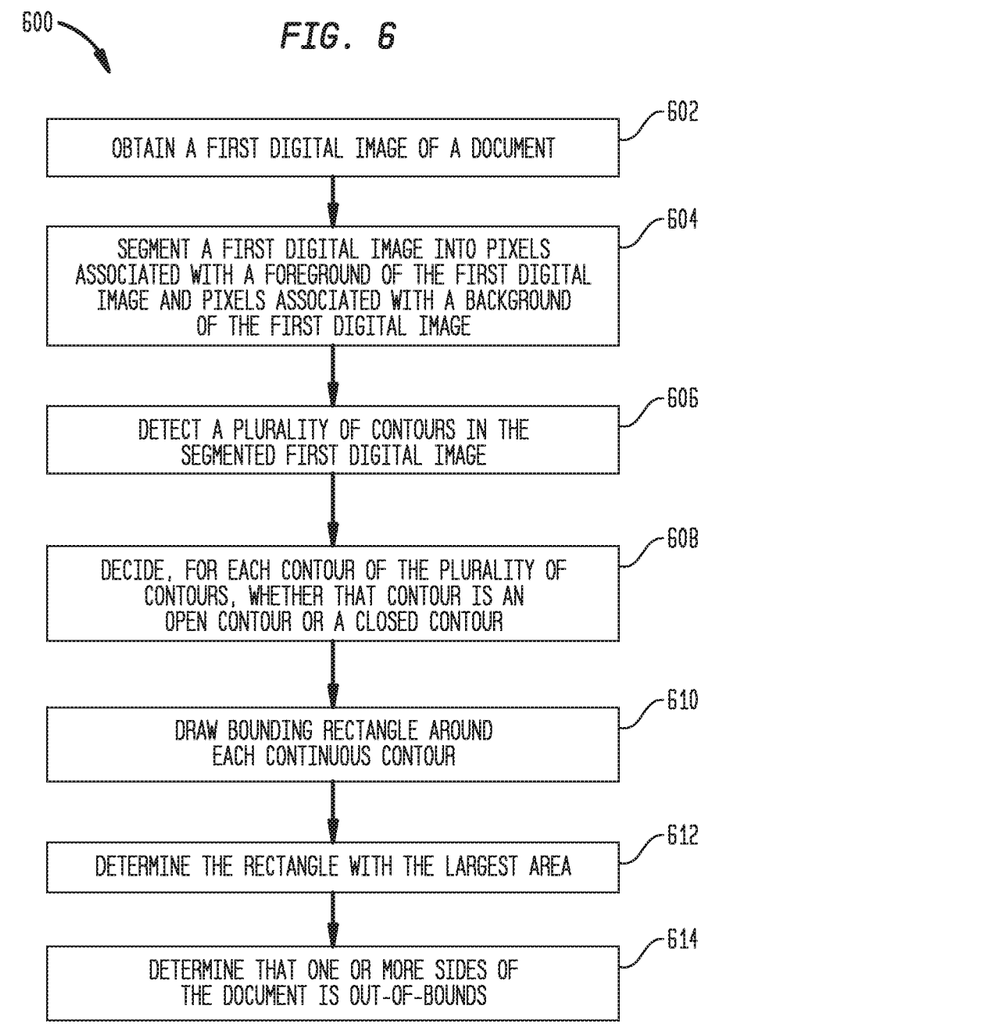
FIG. 6 illustrates a method for determining whether a document is out of bounds of a digital image, according to certain aspects of the present disclosure.

FIG. 6 illustrates example operations 600 for determining bounding information of a document in a digital image, according to certain aspects of the present disclosure. According to certain aspects, example operations 600 may be performed by one or more components capable of processing a digital image, such as the out-of-bounds detection module 210 of the computing device 110.

Figure 7:
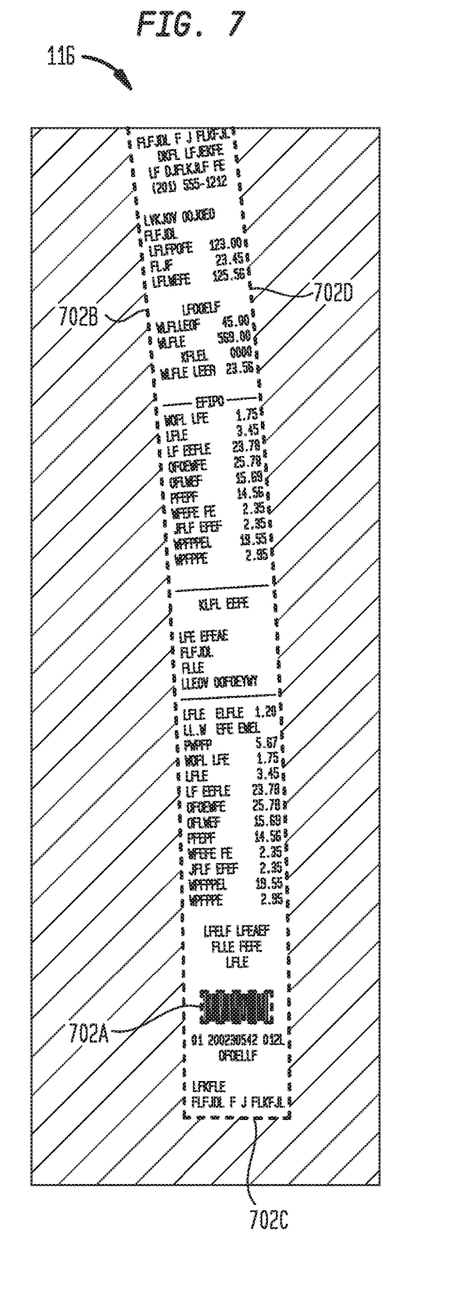
FIG. 7 illustrates example contours found in a digital image, according to certain aspects of the present disclosure.

Operations 600 begin at 602 with the out-of-bounds detection module 210 obtaining a first digital image of a document. An example of a first digital image (e.g., digital image 116) is illustrated in FIG. 7. Additionally, while not illustrated in FIG. 6, the out-of-bounds detection module 210 may scale down the first digital image, for example, to make it easier and faster to determine the contours of the first digital image.

According to aspects, at 604, the out-of-bounds detection module 210 segments the first digital image into two groups of pixels: pixels associated with a foreground of the first digital image (e.g., colored white, not shown) and pixels associated with a background of the first digital image (e.g., colored black, not shown). In some cases, the out-of-bounds detection module 210 segments the first digital image by processing the first digital image with a clustering algorithm (e.g., OpenCV kmeans algorithm). According to aspects, creating this segmented image allows the out-of-bounds detection module 210 to more-easily determine/find the contours in the segmented image (i.e., corresponding to the digital image 116).

According to aspects, once out-of-bounds detection module 210 has created the segmented first digital image, at 606, the out-of-bounds detection module 210 detects contours in the segmented first digital image.

At 608, the out-of-bounds detection module 210 analyzes a hierarchy of the contours (e.g., the nesting of contours) found in the segmented first digital image and decides which contours are open or closed. According to aspects, and as noted above an example of a closed contour is a rectangle whose four sides are all contained within the segmented image. An example closed contour that may be found when processing the segmented first digital image is illustrated at 702A in FIG. 7. According to aspects, an open contour is, for example, a rectangle with one or more sides of the rectangle outside of the segmented image. More specifically, an open contour is one that does not have any child contour in the hierarchy (e.g., the contour does not bound another contour). FIG. 7 illustrates an example of an open contour that may be found when processing the segmented first digital image, which may comprise lines 702B, 702C, and 702D.

Figure 8:
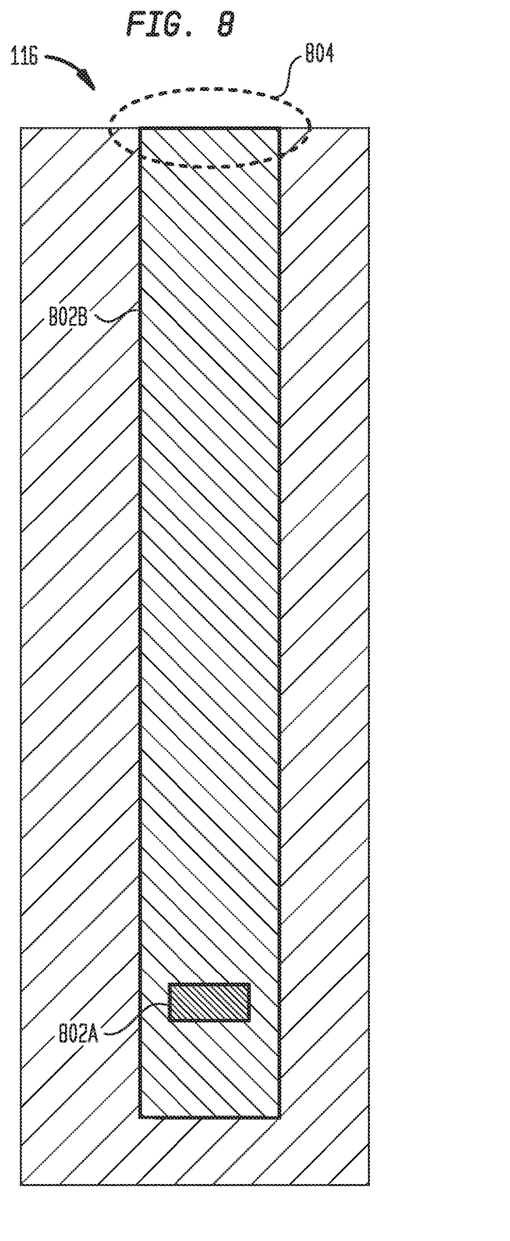
FIG. 8 illustrates drawing bounding rectangles around contours found in a digital image, according to certain aspects of the present disclosure.

At 610, for each continuous contour (e.g., whether open or closed) found in the segmented image, the out-of-bounds detection module 210 is configured to create a bounding rectangle that encompasses that contour. For example, as illustrated in FIG. 8, the out-of-bounds detection module 210 may create a first bounding rectangle 802A around the closed contour 702A and a second bounding rectangle 802B around the open contour corresponding to lines 702B, 702C, and 702D.

At 612, the out-of-bounds detection module 210 determines the area (e.g., pixels squared) of each bounding rectangle. For example, with reference to FIG. 8, the out-of-bounds detection module 210 determines the area of the first bounding rectangle 802A and the area of the second bounding rectangle 802B. The out-of-bounds detection module 210 may then determine which of the first bounding rectangle 802A or the second bounding rectangle comprises the most area. In the example illustrated in FIG. 8, the out-of-bounds detection module 210 may determine that the second bounding rectangle 802B (e.g., which bounds the open contour comprising lines 702B-702D) comprises the most area.

At 614, the out-of-bounds detection module 210 determines whether one or more sides of the document in the segmented first digital image are out of bounds. For example, if the bounding rectangle with the largest area in the first digital image bounds an open contour and if one or more sides of this bounding rectangle touches one or more of the edges of the segmented image, the out-of-bounds detection module 210 may conclude that part of the document in the first digital image is out of bounds. For example, with reference to FIG. 8, since the second bounding rectangle 802B bounds an open contour (e.g., lines 702B-702D) and since the second bounding rectangle 802B touches one of the sides of the first digital image (e.g., at 804), the out-of-bounds detection module 210 determines that a portion of the document in the first digital image is out of bounds.

Otherwise, as noted above, if the bounding rectangle with the largest area bounds an open contour and if none of the sides of this bounding rectangle touches the edges of the segmented image, the out-of-bounds detection module 210 may conclude that the document in the first digital image is not out of bounds of the first digital image. Likewise, if the bounding rectangle with the largest area bounds a closed contour, the out-of-bounds detection module 210 may conclude that the document in the first digital image is not out of bounds of the first digital image.

According to aspects, if the out-of-bounds detection module 210 determines that one or more sides of the document are out of bounds of the first digital image, at 614, the out-of-bounds detection module 210 also determines which sides of the document are out of bounds. For example, the out-of-bounds detection module 210 may analyze the second bounding rectangle 802B and determine which corners of the second bounding rectangle 802B are captured in the first digital image, as well as which corners of the bounding rectangle 802 are out of bounds of the first digital image. For example, with reference to FIG. 8, the out-of-bounds detection module 210 may determine that the bottom left and bottom right corners are contained within the first digital image and that the top left and top right corners are out of bounds of the first digital image. According to aspects, based on the top left and top right corners being out of bounds, the out-of-bounds detection module 210 may deduce that the top side of the document in the first digital image is out of bounds. In some cases, the out-of-bounds detection module 210 may determine which corners are out of bounds (and deduce which side of the document is out of bounds) based on an analysis of which side of the second bounding rectangle 802B touches an edge of the first digital image. For example, as illustrated in FIG. 8, the out-of-bounds detection module 210 will determine that the top-side of the second bounding rectangle 802B touches the edge of the first digital image at 804, and deduce that the top side of the document is out of bounds.

According to aspects and as noted above, if the out-of-bounds detection module 210 determines that one or more sides of the document in the first digital image are out of bounds, the out-of-bounds detection module 210 may direct the user alert module 122 to notify the user of the computing device 110 to capture the at least one additional digital image of the document.

According to aspects, when a font size on the document (e.g., as determined by the font size detection module 208) is greater than or equal to an upper font size threshold, the user alert module 210 alerts the user to capture an image of the entire document at a further distance than the first digital image. In such a case, the computing device 110 may conclude that, since the font size of the document is greater than or equal to an upper font size threshold/bound, allowing the user to take an image of the document at a further distance will still result in a digital image where the textual content of the document is still discernable.

However, when the font size of text on the document (e.g., as determined by the font size detection module 208) is less than or equal to a lower font size threshold/bound, the user alert module 210 alerts the user to capture multiple images of the document, each image of the multiple images focusing on a different portion of the document such that a combination of each image of the multiple images of the document captures the entire document. Thereafter, the computing device 110 may stitch together the multiple images to generate a single image of the document.

Figure 9:
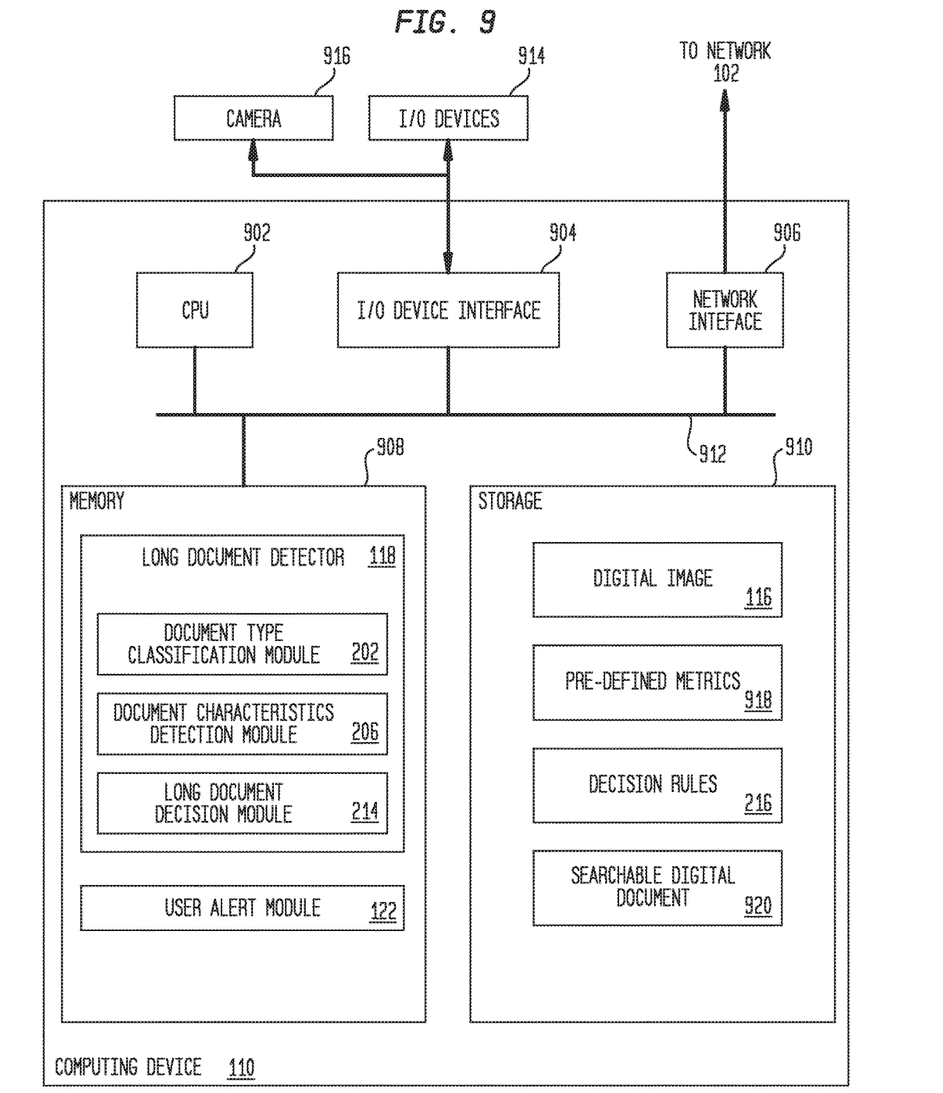
FIG. 9 illustrates an example image processing system that identifies duplicate copies of a form in a document, according to certain aspects of the present disclosure.

FIG. 9 illustrates an example image processing system 900 that determines, among other things, whether a document in a digital image is a long document, according to certain aspects of the present disclosure. As shown, the image processing system 900 includes, without limitation, a central processing unit (CPU) 902, one or more I/O device interfaces 904 which may allow for the connection of various I/O devices 914 (e.g., keyboards, displays, mouse devices, pen input, etc.) and camera 916 to the image processing system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 can represent a single CPU, multiple CPUs, a single CPU having multiple processing cores, and the like. Additionally, the memory 908 represents random access memory. Furthermore, the storage 910 may be a disk drive. Although shown as a single unit, the storage 910 may be a combination of fixed or removable storage devices, such as fixed disc drives, removable memory cards or optical storage, network attached storage (NAS), or a storage area-network (SAN).

As shown, memory 908 includes a long document detector 118 and a user alert module 122. The long document detector 118 comprises a document type classification module 202, a document characteristics detection module 206, and a long document decision module 214. A digital image of a document can be sent to the long document detector 118 from the I/O devices 914, camera 916, or from another source, such as the network 102. The document type classification module 202 can determine a type of the document in the digital image and load pre-defined metrics (e.g., pre-defined metrics 918) associated with documents of the determined type. The document characteristics detection module 206 can determine one or more characteristics associated with the documents, such as a font size of textual content on the document, bounding information associated with one or more sides of the document, dimensions of the document, and/or an aspect ratio of the document. The long document decision module 214 can decide whether the document in the digital image is a long document, for example, based on the loaded pre-defined metrics, the one or more characteristics of the document, and one or more conditions (e.g., decision rules).

As shown, storage 910 includes the digital image 116 (e.g., captured by the user via the camera 916), pre-defined metrics 902, and decision rules 216. According to aspects, the pre-defined metrics 902 may include a font size range for text appearing on documents of the determined type, an aspect ratio threshold, and/or a minimum height percentage of documents of the determined type as compared to a whole digital image of that type of document. Additionally, according to certain aspects, the decision rules 216 may be used by the long document detector 118 to decide whether the document in the digital image 116 is a long document, for example, as explained above.

According to certain aspects, if it is determined that the document in the digital image 116 is a long document, the long document decision component may generate a notification and provide it to the user alert module 122. Upon receiving the notification, the user alert module 122 may inform the user of the computing device 110 to capture additional digital images of the document, each focusing on a different portion of the document. According to aspects, the computing device 110 may stitch together the additional digital images, perform OCR on the stitched together digital images, and store textual content of the document, recognized as a result of OCR, as a searchable digital document 920. In some cases, the computing device 110 may transmit the digital image 116 and/or the searchable digital document 920 via the network interface 906 for storage in a cloud database.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for processing digital images of a document, comprising:
   segmenting a first digital image of a document into pixels associated with a foreground of the first digital image and pixels associated with a background of the first digital image to produce a segmented first digital image;
   detecting a plurality of contours in the segmented first digital image;
   deciding, for each respective contour of the plurality of contours, whether the respective contour is an open contour or a closed contour;
   creating a bounding rectangle for each respective contour of the plurality of contours;
   computing an area of the bounding rectangle for each respective contour of the plurality of contours to identity a largest bounding rectangle;
   determining that a side of a plurality of sides of the document is out-of-bounds based on whether the largest bounding rectangle bounds a respective contour of the plurality of contours that is an open contour;
   informing a user that the document is out-of-bounds;
   informing the user of which particular side of the plurality of sides of the document is out-of-bounds; and
   directing the user to capture at least one additional image of the document.

2. The method of claim 1, wherein determining that the side of the plurality of sides of the document is out-of-bounds comprises determining whether a side of the largest bounding rectangle touches one or more edges of the segmented first digital image.

3. The method of claim 2, wherein determining that the side of the plurality of sides of the document is out-of-bounds further comprises determining one or more corners of the largest bounding rectangle that are out-of-bounds.

4. The method of claim 1, wherein directing the user to capture the at least one additional image of the document comprises alerting the user to capture a single image that fully encompasses the document.

5. The method of claim 1, wherein directing the user to capture the at least one additional image of the document comprises:
   when a font size on the document is greater than or equal to an upper font size threshold, directing the user to capture a single image of the document at a further distance than the first digital image.

6. The method of claim 1, wherein directing the user to capture the at least one additional image of the document comprises:
   when a font size of text on the document is less than or equal to a lower font size threshold, directing the user to capture multiple images of the document, each image of the multiple images focusing on a different portion of the document, wherein a combination of the multiple images of the document entirely encompasses the document.

7. The method of claim 6, further comprising stitching together the multiple images of the document.

8. The method of claim 1, further comprising stopping processing of the first digital image based on the determining that the side of the plurality of sides of the document is out-of-bounds.

9. An apparatus for processing digital images of a document, comprising:
   a processor; and
   a memory having instructions which, when executed by the processor, performs an operation for processing a digital image, the operation comprising:
      segmenting a first digital image of a document into pixels associated with a foreground of the first digital image and pixels associated with a background of the first digital image to produce a segmented first digital image;
      detecting a plurality of contours in the segmented first digital image;
      deciding, for each respective contour of the plurality of contours, whether the respective contour is an open contour or a closed contour;
      creating a bounding rectangle for each respective contour of the plurality of contours;
      computing an area of the bounding rectangle for each respective contour of the plurality of contours to identify a largest bounding rectangle;
      determining that a side of a plurality of sides of the document is out-of-bounds based on whether the largest bounding rectangle bounds a contour of the plurality of contours that is an open contour;
      informing a user that the document is out-of-bounds;
      informing the user of which particular side of the plurality of sides of the document is out-of-bounds; and
      directing the user to capture at least one additional image of the document.

10. The apparatus of claim 9, wherein determining that the side of the plurality of sides of the document is out-of-bounds comprises determining whether a side of the largest bounding rectangle touches one or more edges of the segmented first digital image.

11. The apparatus of claim 10 wherein determining that the side of the plurality of sides of the document is out-of-bounds further comprises determining one or more corners of the largest bounding rectangle that are out-of-bounds.

12. The apparatus of claim 9, wherein directing the user to capture the at least one additional image of the document comprises alerting the user to capture a single image that fully encompasses the document.

13. The apparatus of claim 9, wherein directing the user to capture the at least one additional image of the document comprises:
   when a font size on the document is greater than or equal to an upper font size threshold, directing the user to capture a single image of the document at a further distance than the first digital image.

14. The apparatus of claim 9, wherein directing the user to capture the at least one additional image of the document comprises:
   when a font size of text on the document is less than or equal to a lower font size threshold, directing the user to capture multiple images of the document, each image of the multiple images focusing on a different portion of the document, wherein a combination of the multiple images of the document entirely encompasses the document.

15. The apparatus of claim 14, wherein the operation further comprises stitching together the multiple images of the document.

16. The apparatus of claim 9, further comprising stopping processing of the first digital image based on the determining that the side of the plurality of sides of the document is out-of-bounds.

17. A non-transitory computer-readable medium comprising instructions which, when executed on one or more processors, performs an operation for processing a digital image of a document, comprising:

segmenting a first digital image of a document into pixels associated with a foreground of the first digital image and pixels associated with a background of the first digital image to produce a segmented first digital image;

detecting a plurality of contours in the segmented first digital image;

deciding, for each respective contour of the plurality of contours, whether that the respective contour is an open contour or a closed contour;

creating a bounding rectangle for each respective contour of the plurality of contours;

computing an area of the bounding rectangle for each respective contour of the plurality of contours to identify a largest bounding rectangle;

determining that a side of a plurality of sides of the document is out-of-bounds based on whether the largest bounding rectangle bounds a contour of the plurality of contours that is an open contour;

informing a user that the document is out-of-bounds;

informing the user of which particular side of the plurality of sides of the document is out-of-bounds; and directing the user to capture at least one additional image of the document.

18. The non-transitory computer-readable medium of claim 17, wherein determining that the side of the plurality of sides of the document is out-of-bounds comprises determining whether a side of the largest bounding rectangle touches one or more edges of the segmented first digital image.

19. The non-transitory computer-readable medium of claim 18 wherein determining that the side of the plurality of sides of the document is out-of-bounds further comprises determining one or more corners of the largest bounding rectangle that are out-of-bounds.

20. The non-transitory computer-readable medium of claim 17, wherein directing the user to capture the at least one additional image of the document comprises alerting the user to capture a single image that fully encompasses the document.

* * * * *